(12) United States Patent
Okamura et al.

(10) Patent No.: US 6,494,510 B2
(45) Date of Patent: Dec. 17, 2002

(54) IMPACT ABSORBING MECHANISM AND BUMPER REINFORCEMENT HAVING THE MECHANISM

(75) Inventors: Masaharu Okamura, Kamo-gun; Toshifumi Sakai, Higashihiroshima, both of (JP)

(73) Assignee: G P Daikyo Corporation, Hiroshima (JP)

( * ) Notice: Subject to any disclaimer, the term of this patent is extended or adjusted under 35 U.S.C. 154(b) by 0 days.

(21) Appl. No.: 09/782,566

(22) Filed: Feb. 13, 2001

(65) Prior Publication Data

US 2001/0013705 A1 Aug. 16, 2001

(30) Foreign Application Priority Data

Feb. 15, 2000 (JP) ........................................ 2000-036726

(51) Int. Cl.[7] .......................... B60R 19/04; B60R 19/34
(52) U.S. Cl. ........................ 293/149; 293/150; 293/151; 293/152; 293/153; 293/155; 293/133
(58) Field of Search ................................ 293/133, 149, 293/150, 151, 152, 153, 155

(56) References Cited

U.S. PATENT DOCUMENTS

| | | | | |
|---|---|---|---|---|
| 1,564,279 A | * | 12/1925 | Ross ........................... | 293/152 |
| 1,810,502 A | * | 6/1931 | Thomas ....................... | 293/155 |
| 1,901,227 A | * | 3/1933 | Cossalter .................... | 293/150 |
| 3,120,973 A | * | 2/1964 | Ramsey ....................... | 293/150 |
| 3,663,048 A | * | 5/1972 | Zimmerle .................... | 293/150 |
| 6,007,123 A | * | 12/1999 | Schwartz et al. ............ | 293/132 |

FOREIGN PATENT DOCUMENTS

| | | |
|---|---|---|
| JP | 10-076889 | 3/1998 |
| JP | 11-255049 | 9/1999 |

* cited by examiner

Primary Examiner—Stephen T. Gordon
Assistant Examiner—Hilary Gutman
(74) Attorney, Agent, or Firm—Merchant & Gould P.C.

(57) ABSTRACT

An impact absorbing mechanism for absorbing an impact load input between receiving portions at a predetermined distance from each other is provided; in the impact absorbing mechanism, a dispersing transferring portion for dispersing and transferring the input impact load in two directions is formed by connecting respective one end sides of two load transferring members, impact absorbing members for absorbing dispersed impact loads in directions along the transferring members and supported by receiving stopping portions are disposed on the other end sides of the respective load transferring members, a connecting portion of the load transferring members is positioned to be closer to load input sides than to the other end sides of the respective load transferring members, and the input impact load is dispersed and absorbed in two directions; thereby, it is possible to obtain an impact absorbing mechanism by which impact energy absorbing performance in a displacement initial stage is enhanced to carry out efficient impact absorption and it is possible to relatively easily cope with changes in required impact absorbing properties.

9 Claims, 16 Drawing Sheets

IMPACT ABSORBING MECHANISM AND BUMPER REINFORCEMENT HAVING THE MECHANISM

BACKGROUND OF THE INVENTION

1. Field of the Invention

The present invention relates to an impact absorbing mechanism and a bumper reinforcement having the mechanism.

2. Description of the Related Art

As is well known, a vehicle such as an automobile is provided with an impact absorbing mechanism for absorbing an impact load when the impact load is applied to a vehicle body in, for example, a collision of the vehicle. In Japanese Patent Laid-open Publication No. 11-255049, for example, there is disclosed an impact absorbing structure for carrying out impact absorption by providing a crush box to a portion corresponding to a mounting portion where a reinforcement made of resin is mounted to a vehicle body. A reinforcing rib is provided to the reinforcement. Because the crush box is formed by partitioning an inside of a box body using a large number of ribs to create a so-called honeycomb-shaped structure, impact absorbing efficiency is satisfactory. However, as the impact absorbing structure is a whole structure, the impact absorption at the time of initial displacement is not satisfactory.

In Japanese Patent Laid-open Publication No. 10-76889, there is disclosed a structure in which a steel sheet is subjected to press forming to form a bumper reinforcement in a rectangular sectional shape separated vertically and extending longitudinally and brackets for mounting the bumper reinforcement to a vehicle body are provided to a curved side of the bumper reinforcement. In this prior art, by providing a substantially straight plate connecting the brackets, an impact absorbing effect is enhanced.

In recent years, providing both impact absorbing properties in two stages, i.e., properties of impact absorption in a displacement initial stage and absorption of a larger impact load after the initial stage are required of a bumper of an automobile. The former impact absorption (in the initial stage) corresponds to energy absorption for protecting a pedestrian on the chance that the automobile collides with the pedestrian, for example. The latter impact absorption corresponds to energy absorption for protecting a vehicle body on the chance that the vehicle collides with an object, for example.

However, in both the pieces of prior art, impact at the time of initial displacement is absorbed by bending of the reinforcement only and impact energy that can be absorbed by a narrow range of displacement is limited. Therefore, a satisfactory impact absorbing effect cannot be obtained in actuality. In other words, it is difficult to satisfactorily carry out impact absorption especially in the displacement initial stage by the prior-art bumper.

Furthermore, it is difficult to obtain an optimum impact absorbing structure such as a bumper based on a desk design and a structure having required properties is obtained by repeating field tests such as actual crash experiments and by trial and error. If specifications required for the impact absorbing structure such as a bumper are changed due to a change in design of a vehicle, for example, design and development to cope with the change can take considerable time and money.

SUMMARY OF THE INVENTION

The invention has been accomplished with the above various problems in view and it is a basic object of the invention to provide an impact absorbing mechanism by which impact energy absorbing performance in a displacement initial stage is enhanced to carry out efficient impact absorption and it is possible to relatively easily cope with changes in required impact absorbing properties. Also, it is another basic object of the invention to provide a bumper reinforcement in which the above mechanism is incorporated for carrying out impact absorption.

In order to achieve the above-mentioned objects, an impact absorbing mechanism according to a first aspect of the present invention is provided between receiving portions at a predetermined distance from each other for absorbing an impact load input between the receiving portions. This impact absorbing mechanism includes a dispersing transferring portion for dispersing and transferring the input impact load in a plurality of directions, impact absorbing portions for respectively absorbing dispersed impact loads from the dispersing transferring portion, and receiving stopping portions for respectively supporting the impact absorbing portions. The impact load is dispersed and absorbed in the plurality of directions by the impact absorbing mechanism.

With the impact absorbing mechanism according to the first aspect of the present invention, the impact load can be dispersed and transferred in the plurality of directions from the input initial stage (i.e., displacement initial stage) of the impact load, and the dispersed impact loads can be absorbed by the respective impact absorbing portions. Therefore, efficient impact absorption can be carried out from the displacement initial stage. Furthermore, if the impact absorbing properties required for the impact absorbing mechanism are changed, it is possible to cope with such changes relatively easily by changing design of the impact absorbing portions only.

Also, according to a second aspect of the present invention, there is provided a bumper reinforcement that includes a case body having a substantially angular U shape in section and an impact absorbing mechanism provided between receiving portions at a predetermined distance from each other for absorbing an impact load input between said receiving portions. This impact absorbing mechanism includes a dispersing transferring portion for dispersing and transferring said input impact load in a plurality of directions, impact absorbing portions for respectively absorbing dispersed impact loads from said dispersing transferring portion, and receiving stopping portions for respectively supporting said impact absorbing portions. The impact load is dispersed and absorbed in said plurality of directions by the impact absorbing mechanism. Furthermore, at least said dispersing transferring portion and said impact absorbing portions of said impact absorbing mechanism are housed in said case body. And, said impact load input side of said dispersing transferring portion is supported by upper and lower wall portions of said case body.

In the above aspects of the present invention, it is preferable that second impact absorbing portions for carrying out impact absorption after the impact load is transferred to the dispersing transferring portion are provided in portions corresponding to the receiving portions of the impact absorbing mechanism or in proximity of the portions.

By providing said second impact absorbing portions, the impact absorption can be carried out by the second impact absorbing portions after the impact load is transferred to the dispersing transferring portion. Therefore, it is possible to efficiently absorb the impact load with different absorbing properties in the initial stage and the middle stage after the initial stage.

In this case, it is more preferable that said receiving stopping portions are integrally formed with side faces of said second impact absorbing portions. Thereby, the structure of the receiving stopping portions and the second impact absorbing portions can be simplified.

Furthermore, in the above aspects of the present invention, it is preferable that the dispersing transferring portion is formed by connecting respective ends of a plurality of transferring members, and a connecting portion is positioned to be closer to load input sides than to the other end of the respective transferring members. Also, the impact absorbing members, for absorbing impact loads in directions along the transferring members, are disposed on the other ends of the respective transferring members.

By employing such a construction, the impact load can be reliably dispersed and transferred in the plurality of directions from the input initial stage of the impact load, and the dispersed impact loads can be respectively absorbed by the impact absorbing portions on the other ends of the respective transferring members, since the dispersing transferring portion is specifically formed by connecting the respective ends of the plurality of transferring members, and the connecting portion is positioned to be closer to the load input sides than to the other ends of the respective transferring members.

In this case, it is more preferable that the dispersing transferring portion includes two transferring members, the receiving stopping portions corresponding to the other ends of the transferring members being integrally connected to each other through a connecting member, and the connecting member and the two transferring members being respectively positioned on respective sides of a substantially triangular shape.

By employing such a constitution, the receiving stopping portions can be integrally connected to each other. Also, the substantially triangular structure can be formed by the connecting member and the two transferring members. And, it is possible to suppress outward movement of the receiving stopping portions that causes bending loads to act on support structures of the receiving stopping portions when the impact load is applied between the receiving stopping portions. Therefore, it is unnecessary to make the supporting structures of the receiving stopping portions excessively strong.

Furthermore, it is more preferable that a joint member substantially parallel to a straight line connecting the receiving portions is disposed as a connecting portion for connecting the respective ends of the transferring members. Thereby, impact load can be transferred along the respective transferring members through the joint member, and impact absorption can be carried out efficiently, even if the impact load is transferred to a portion that deviates from the center between the receiving portions.

Furthermore, it is more preferable that each of the impact absorbing members is formed into a box shape with ribs formed on an inside of the box shape. Thereby, it is possible to relatively easily adjust and change the impact absorbing property of the impact absorbing members by changing design features such as shapes and plate thicknesses of the box body and/or ribs, material, or the like.

Furthermore, it is more preferable that each of the transferring members is divergent such that a basic sectional area increases toward each of the impact absorbing members. By employing such a construction, the basic sectional area on the side for absorbing and receiving the load is larger than that on the load input side, thereby stabilizing the member. Therefore, when the impact is transferred to the connecting portion, the load transferring member does not tilt or rotate in the vertical direction and the dispersed impact load can be reliably transferred to the impact absorbing member.

DESCRIPTION OF THE PREFERRED EMBODIMENTS

Embodiments of the present invention will be described below in detail by reference to accompanying drawings. In the embodiments, the invention is applied to an impact absorbing mechanism of a bumper reinforcement of a vehicle bumper provided, for example, at both a front and a rear of a vehicle body of an automobile.

Figure 1:
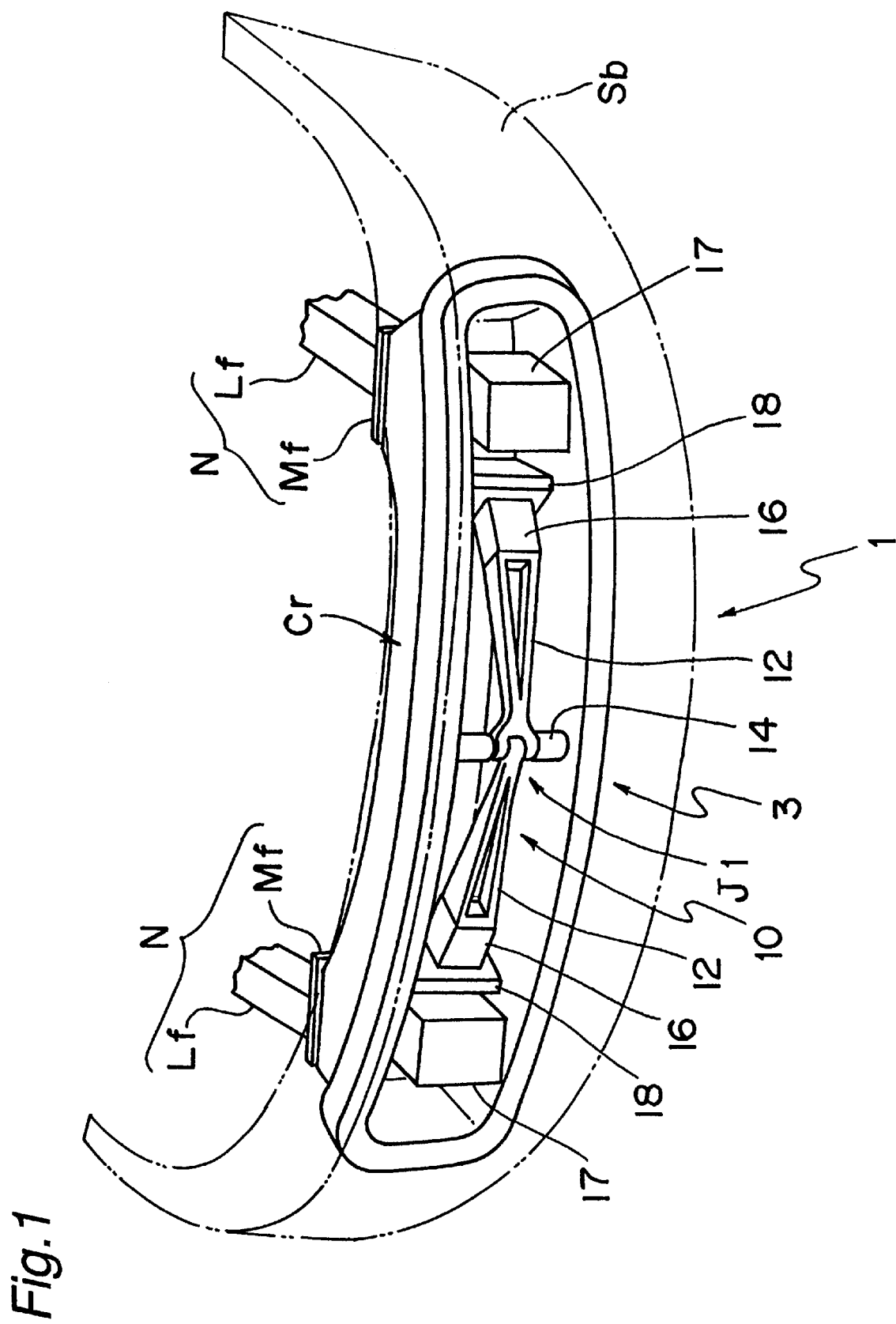
FIG. 1 is a perspective view of a vehicle bumper according to a first embodiment of the present invention.
Figure 2:
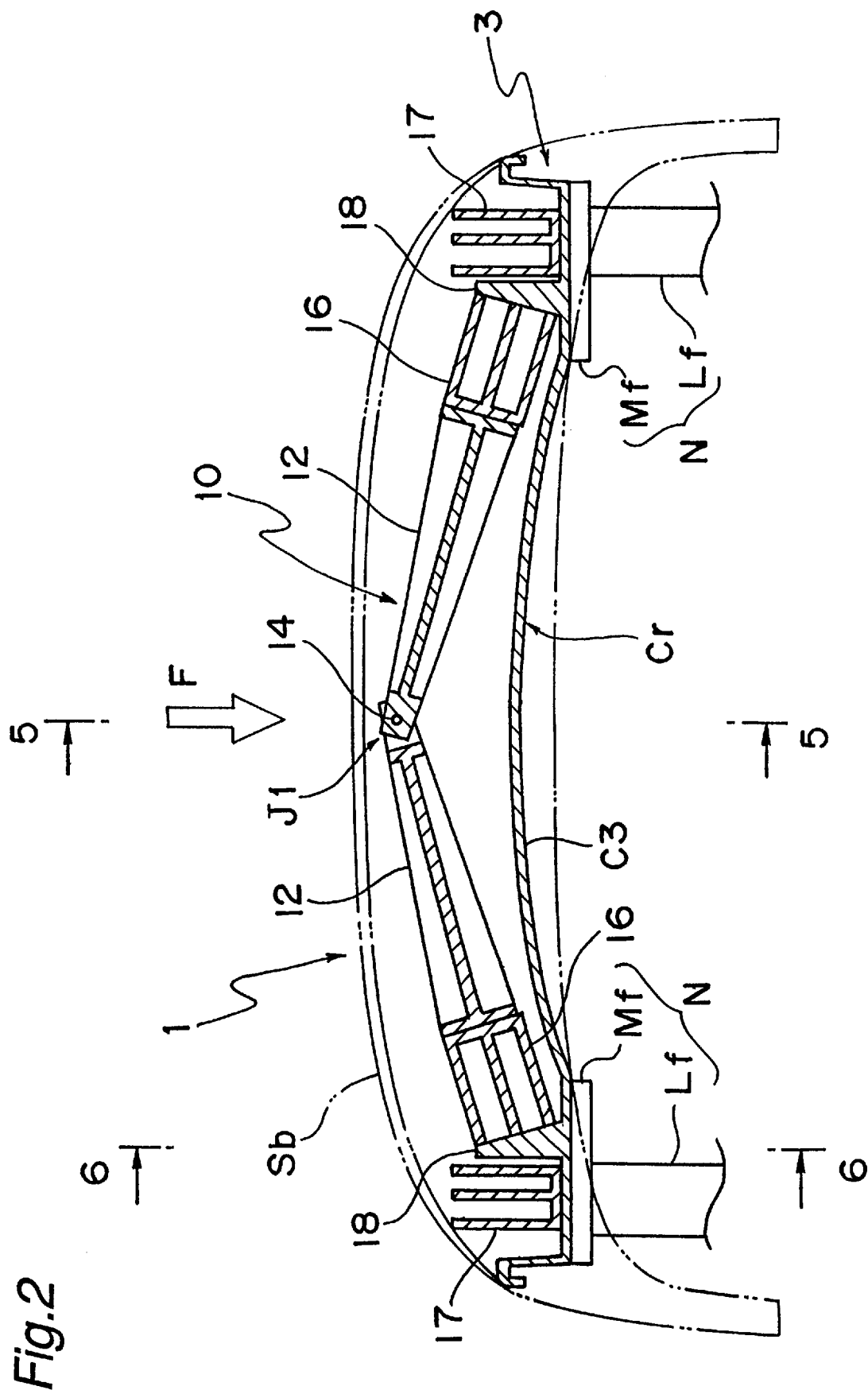
FIG. 2 is a plan view of the bumper.
Figure 3:
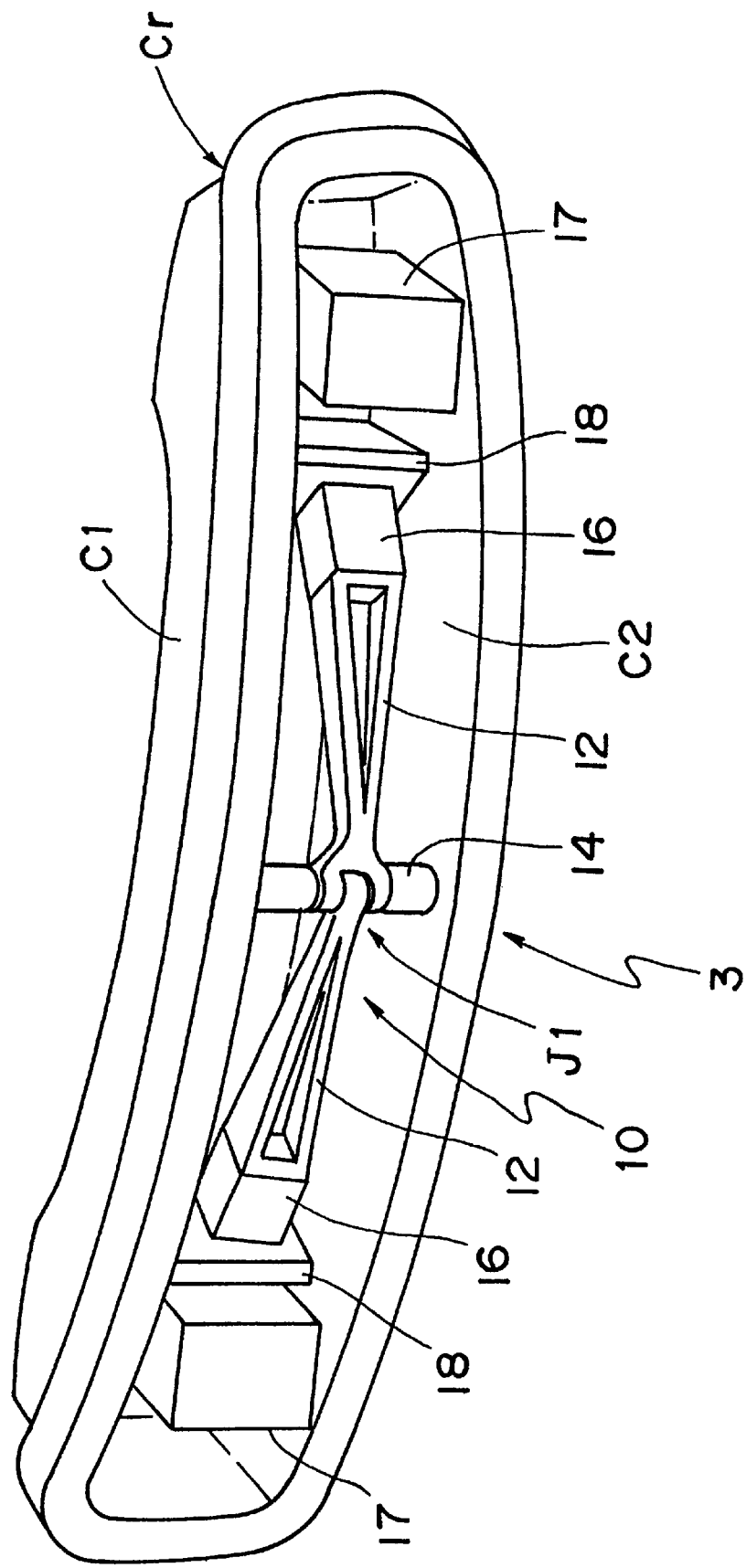
FIG. 3 is a perspective view of a bumper reinforcement of the bumper.
Figure 4:
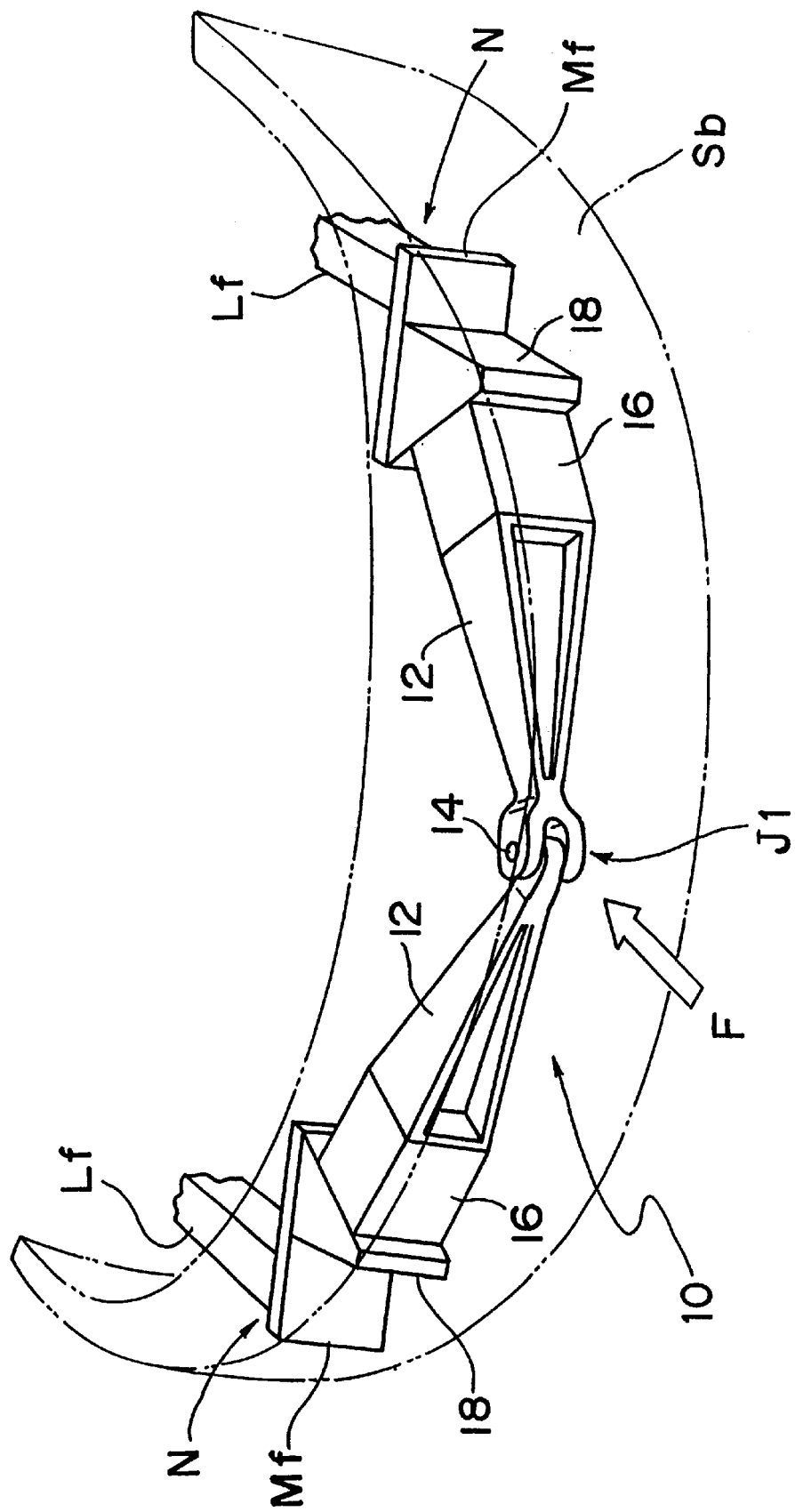
FIG. 4 is a perspective view of a main portion of an impact absorbing mechanism of the bumper reinforcement.

FIGS. 1 and 2 are a perspective view and a plan view of a vehicle bumper (e.g., a front bumper) according to a first embodiment of the invention. FIG. 3 is a perspective view of a bumper reinforcement. FIG. 4 is a perspective view of a main portion of an impact absorbing mechanism incorporated into the bumper reinforcement.

As shown in the drawings, a bumper 1 (a front bumper, for example) according to the present embodiment includes a bumper reinforcement 3 having a case body Cr and a bumper face Sb covering at least front and upper portions of the bumper reinforcement. The bumper 1 is disposed on front end sides of a pair of left and right front side frames Lf extending from a forward to rearward direction at a front portion of the vehicle.

Figure 5:
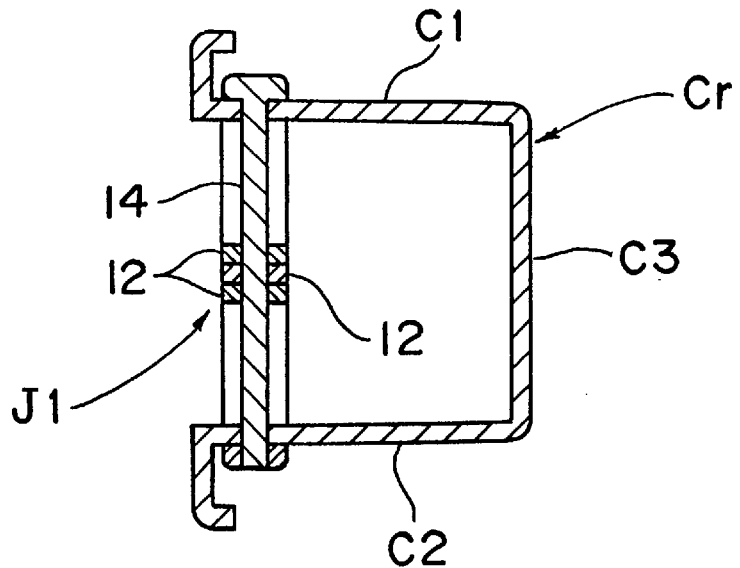
FIG. 5 is a vertical sectional view taken along a line Y5—Y5 in FIG. 2.
Figure 6:
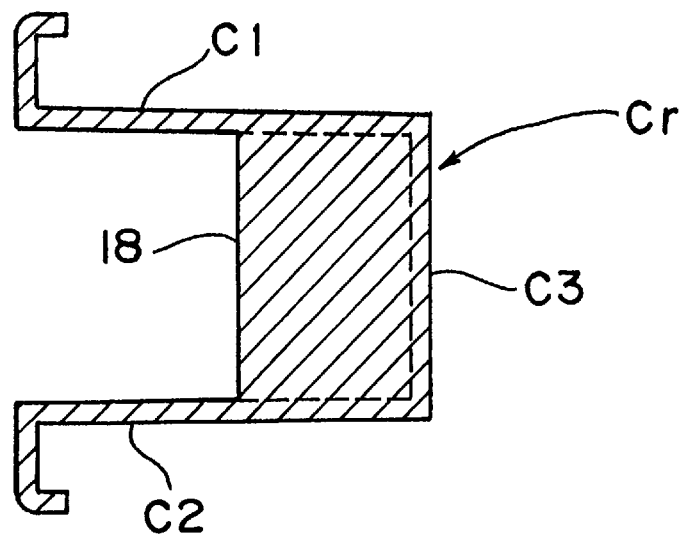
FIG. 6 is a vertical sectional view taken along a line Y6—Y6 in FIG. 2.

As shown in detail in FIGS. 5 and 6, the case body Cr is formed of upper and lower wall portions C1 and C2 and a vertical wall C3 connecting rear edge portions of both the upper and lower wall portions C1 and C2. The case body Cr is formed to have a substantially angular U shape in section and is disposed such that an open side of the case body Cr is oriented forward. Alternatively, it is also possible to form the case body into a substantially angular U shape in section that is inverted such that the vertical wall is positioned on a front face and the opening is oriented rearwardly.

Back face sides of predetermined positions of the vertical wall C3 are fixed to front end portions of the side frames Lf through mounting brackets Mf. The front ends of the side frames Lf and the mounting brackets Mf form "receiving portions." The receiving portions N are provided in a left and right pair at a predetermined distance from each other in positions corresponding to the side frames Lf.

In the impact absorbing mechanism 10, a dispersing transferring portion for dispersing and transferring the input impact load in a plurality of directions (two directions in the embodiment) is provided. The dispersing transferring portion is formed by connecting respective ends of a plurality of (two) load transferring members 12 by a connecting portion J1.

As can be seen well from FIG. 5, the connecting portion J1 is provided with a pivot 14 passing through hole portions provided in the end portions on the center side of the respective load transferring members 12 and extending vertically. Upper and lower end portions of the pivot 14 are mounted to the upper and lower wall portions C1 and C2 of the case body Cr. By the pivot 14, the end portions on the center side of the respective load transferring members 12 are rotatably supported in a horizontal plane without rattling.

The connecting portion J1 is positioned closer to the load input sides (front sides) than the other end sides of the respective load transferring members 12. Therefore, when the impact load F is input from the front of the bumper 1, the load first acts on the connecting portion J1 through the bumper face Sb. Then, the impact load F is divided into two in substantially leftward and rightward directions along the respective transferring members 12.

On the other ends of the load transferring members 12, impact absorbing members 16 (first impact absorbing members) act as impact absorbing portions for absorbing dispersed impact loads (impact loads that have been dispersed) transferred by the load transferring members 12. One end side of each impact absorbing member 16 is integrally connected to the other end side of the load transferring member 12. The impact absorbing member 16 absorbs the dispersed impact load in a direction along the load transferring member 12 from the input initial stage of the impact load F.

The load transferring members 12 and the first impact absorbing members 16 are connected by bonding, welding, seizing, or by a mechanical method such as fitting or screwing, for example. Alternatively, it is also possible to integrally mold both the members 12 and 16 depending on producing methods of the respective members 12 and 16.

On the other end of each first impact absorbing member 16, a receiving stopping portion 18 for supporting the impact absorbing member 16 is positioned. The receiving stopping portion 18 is fixed at least to the vertical wall C3 of the case body Cr (as well as possible to the upper and lower wall portions C1 and C2 in the embodiment), and is supported by the above-mentioned receiving portion N (directly by the mounting bracket Mf) through the vertical wall C3. In this configuration, since the receiving stopping portion 18 is fixed to the mounting bracket Mf that is fixed to the side frame Lf of the vehicle body, it is possible to reliably receive the impact load.

Therefore, when the first impact absorbing member 16 receives the dispersed impact load from the load transferring member 12, the first impact absorbing member 16 suffers compressing, deformation, and/or buckling deformation to reliably absorb the impact while the rear end side of the first impact absorbing member 16 is supported by the receiving stopping portion 18.

The other end of each first impact absorbing member 16 and the receiving stopping portion 18 are connected by bonding, welding, seizing, or by a mechanical method such as fitting or screwing, for example. Otherwise, it is also possible to integrally mold both the members 16 and 18 depending on producing methods of the respective members 16 and 18.

The receiving stopping portion 18 may be integrally formed with the case body Cr depending on a producing method of the case body Cr or may be produced separately and connected to the case body Cr. In this case, above examples of the connecting method are employed. It is also possible that the receiving stopping portion 18 is directly fixed to or integrally formed with the receiving portion N (specifically, to or with the mounting bracket Mf). In this case, an opening may be provided to a corresponding portion of the vertical wall C3 of the case body Cr.

Each impact absorbing member 17 (second impact absorbing member) extending substantially straight in a forward-rearward direction is provided at a portion corresponding to each of the left and right receiving portions N or in a vicinity thereof. In the embodiment, the second impact absorbing member 17 is provided at a position on a side of the receiving stopping portion 18 and along an extension of an axis of the front side frame Lf.

Each second impact absorbing member 17 (so-called crush can) has a front end portion positioned at a necessary rearward distance from the connecting portion J1 of the load transferring member 12. Therefore, impact absorption by the second impact absorbing member 17 is carried out after the impact load F is input to the connecting portion J1 of the dispersing transferring portion and impact force corresponding to initial displacement is absorbed by the first impact absorbing member 16.

The second impact absorbing member 17 is fixed at least to the vertical wall C3 of the case body Cr and supported by the above receiving portion N (directly by the mounting bracket Mf) through the vertical wall C3. A rear end side of each second impact absorbing member 17 and the vertical wall C3 are connected by bonding, welding, seizing, or by a mechanical method such as fitting or screwing, for example. Otherwise, it is also possible to integrally mold both the member 17 and the case body Cr depending on producing methods of the member 17 and the case body Cr. Furthermore, it is also possible that the second impact absorbing member 17 is directly fixed to or integrally formed with the receiving portion N (specifically, to or with the mounting bracket Mf). In this case, an opening may be provided to a corresponding portion of the vertical wall C3 of the case body Cr.

Example material used to create the load transferring members 12, the first and second impact absorbing members 16 and 17, the receiving stopping portions 18, and the case body Cr, may include: metal such as steel, magnesium, aluminum, magnesium alloy, aluminum alloy, and the like, or synthetic resin such as polyethylene resin, polypropylene resin, nylon resin, and the like.

In connecting the respective members, it is preferable to connect them such that no gap is created between the faces to be connected.

Figure 7A:
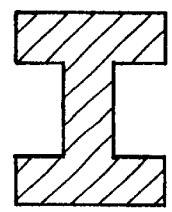
FIGS. 7A, 7B and 7C are vertical sectional views for illustrating sectional shapes of a load transferring member of the impact absorbing mechanism.
Figure 7B:
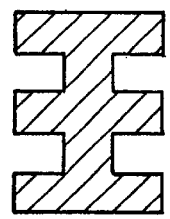
Figure 7C:
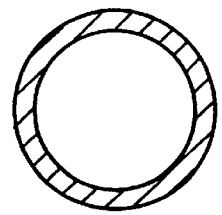

The load transferring member 12 is used to transfer the impact load without being easily bent, easily suffering buckling deformation, or being broken especially due to load input in a longitudinal direction of the load transferring member 12. And, it is set to have high strength and rigidity that are higher than predetermined values. Regarding the sectional shape of the load transferring member 12, various example shapes as shown in FIGS. 7A to 7C. In the example embodiment, the sectional shape as shown in FIG. 7A is employed. p1 Each load transferring member 12 is divergent to broaden such that a basic sectional area increases toward the first impact absorbing member 16. By forming the member 12 into such a shape, a basic sectional area on a side for absorbing and receiving the load is larger than that on the load input side, thereby stabilizing the member 12. Therefore, when the impact load F is inputted to the connecting portion J1, a problem of tilting or rotating of the load transferring member 12 in a vertical direction does not occur and the dispersed impact load can be reliably transferred to the first impact absorbing member 16.

The first impact absorbing member 16 is formed into a box shape (substantially rectangular shape in a plan view), the entire shape being substantially in the shape of a rectangle including a plurality of pipes with one end thereof being open. Inside the box shape, ribs are provided preferably. Examples of the entire shape of the first impact absorbing member 16 are shown in FIGS. 8A to 8C and FIGS. 9A to 9C, for example. As a structure of the first impact absorbing member 16, it is preferable to provide a plurality of ribs in a box body such that the ribs cross each other as shown in FIGS. 8B, 8C, 9B, and 9C. Furthermore, a large number of ribs may cross each other to form a honeycomb-shaped structure, for example, in the box body.

Because the first impact absorbing member 16 is formed into the box shape having the ribs, as described above, by changing design features such as shapes and plate thicknesses of the box body and/or ribs, material, or the like, it is possible to relatively easily adjust and change an impact absorbing property of the first impact absorbing member 16 only.

Although an opening side of the first impact absorbing member 16 is connected to the receiving stopping portion 18 while a closed face side of the first impact absorbing member 16 is connected to the load transferring member 12, positions of the opening and the closed face may be exchanged. An orientation of the first impact absorbing member may be determined (such that the closed face faces the member with which the first impact absorbing member 16 is to be integrated) depending on with which of the receiving stopping portion 18 and the load transferring member 12 the first impact absorbing member 16 is integrally formed.

Although a size of the second impact absorbing member 17 (so-called crush can) is different from that of the first impact absorbing member 16, a structure of the member 17 is similar to that of the member 16. In this case, it is preferable that a closed face side of the member 17 faces the receiving portion N while an opening side faces the load input side. By disposing the second impact absorbing member 17 in this orientation, it is possible to fix the second impact absorbing member 17 to the case body Cr of the reinforcement 3 more easily and more firmly than when the member 17 is disposed in a reverse orientation.

The case body Cr may be disposed in such an orientation that the vertical wall C3 is positioned in the front face and that the opening is oriented rearwardly (in an orientation reverse to that in FIGS. 5 and 6) in the substantially angular U shape. In this case, the second impact absorbing member 17 and the receiving stopping portion 18 may be formed integrally with the case body Cr in a state in which the member 17 and the receiving stopping portion 18 are housed in a space formed by the vertical wall C3 and the upper and lower wall portions C1 and C2.

Figure 8A:
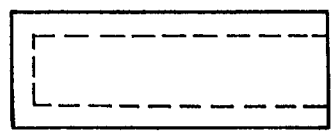
FIGS. 8A, 8B and 8C are front views for illustrating an impact absorbing member of the impact absorbing mechanism.
Figure 8B:
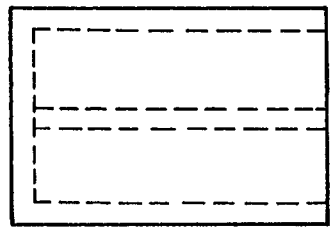
Figure 8C:
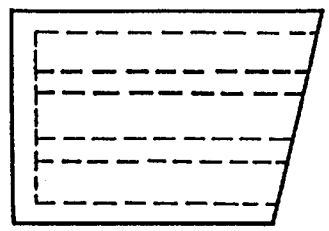
Figure 9A:
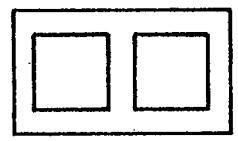
FIGS. 9A, 9B and 9C are side views of each the impact absorbing member in FIGS. 8A, 8B and 8C taken in directions of arrows Ya, Yb and Yc.
Figure 9B:
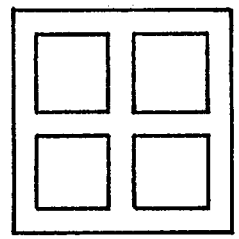
Figure 9C:
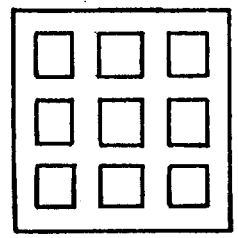

In the embodiment, structures shown in FIGS. 8B and 9B are employed as structures of the first and second impact absorbing members 16 and 17.

Figure 10:
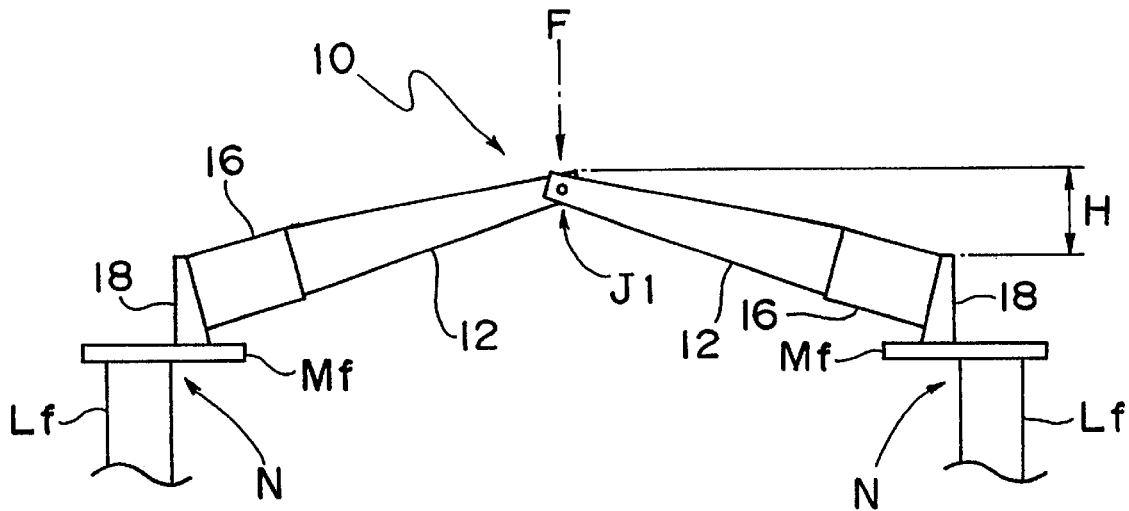
FIG. 10 is a plan view showing a state of the impact absorbing mechanism before impact load input.
Figure 11:
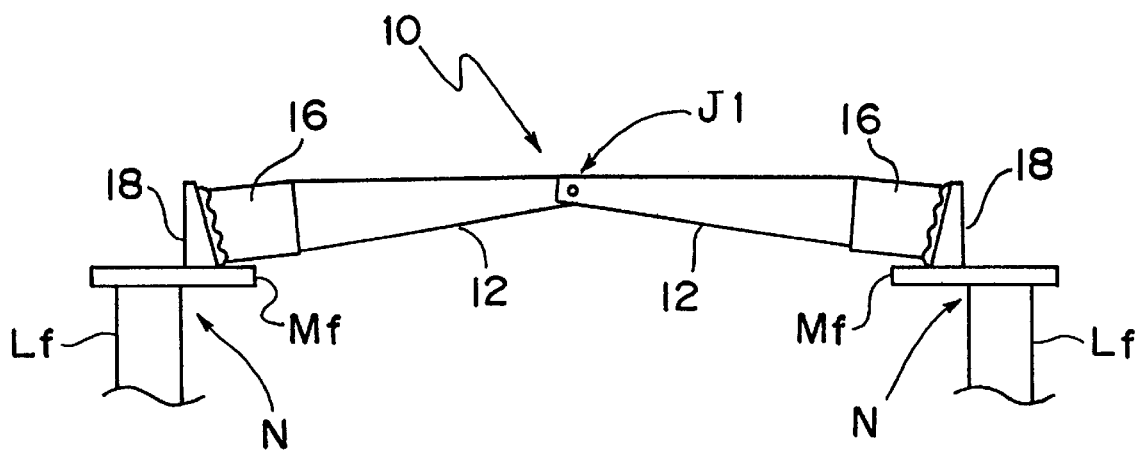
FIG. 11 is a plan view showing a state of the impact absorbing mechanism after impact load input.

In the above structure, when the impact load F is inputted from the front of the bumper 1 to a substantially central portion between the left and right receiving portions N, the impact load F is first transferred to the connecting portion J1 through the bumper face Sb. Then, the impact load F is dispersed (divided into two) into directions along the two load transferring members 12 and transmitted by these members 12, and absorbed by the first impact absorbing members 16 connected to the respective load transferring members 12. Impact absorption by the first impact absorbing members 16 only is carried out until the loads start to act on the second impact absorbing members 17 after the first impact absorbing members 16 are deformed by amounts equal to or more than a predetermined amount. FIGS. 10 and 11 show a form of impact absorption (a deformation amount H in a forward-rearward direction in response to the impact absorption) in an input initial stage by the first impact absorbing members 16 only. It is to be noted that illustrations of the second impact absorbing members 17 are omitted in FIGS. 10 and 11.

In such a way, according to the impact absorbing mechanism 10 of the embodiment, the impact load F can be dispersed and transferred in the plurality of directions (two directions) from the input initial stage (i.e., displacement initial stage) of the impact load F and the dispersed impact loads can be absorbed by the respective impact absorbing members 16. Therefore, efficient impact absorption can be carried out from the displacement initial stage. If the impact absorbing property required of the impact absorbing mechanism 10 is changed, it is possible to relatively easily cope with this change by only changing the design of the impact absorbing members 16.

Then, when the first impact absorbing members 16 are deformed by a certain amount or more and the load also acts on the second impact absorbing members 17, impact absorption is carried out by both the impact absorbing members 16 and 17. In other words, after the impact absorption by only the first impact absorbing members 16 in the load input initial stage, impact absorption by both the first and second impact absorbing members 16 and 17 in a middle stage is carried out. Then, when both the impact absorbing members 16 and 17 are deformed by a predetermined amount or more to reach the limitations, impact absorption by deformation of the front side frames Lf begins.

As described above, by providing the second impact absorbing members 17, the impact absorption by the second impact absorbing members 17 can be carried out after the impact load is input to the dispersing transferring portion and the impact absorption is carried out by the first impact absorbing members 16 only. Therefore, the impact load can be absorbed efficiently with different absorbing properties in the initial stage and the middle stage after the initial stage.

Figure 12:
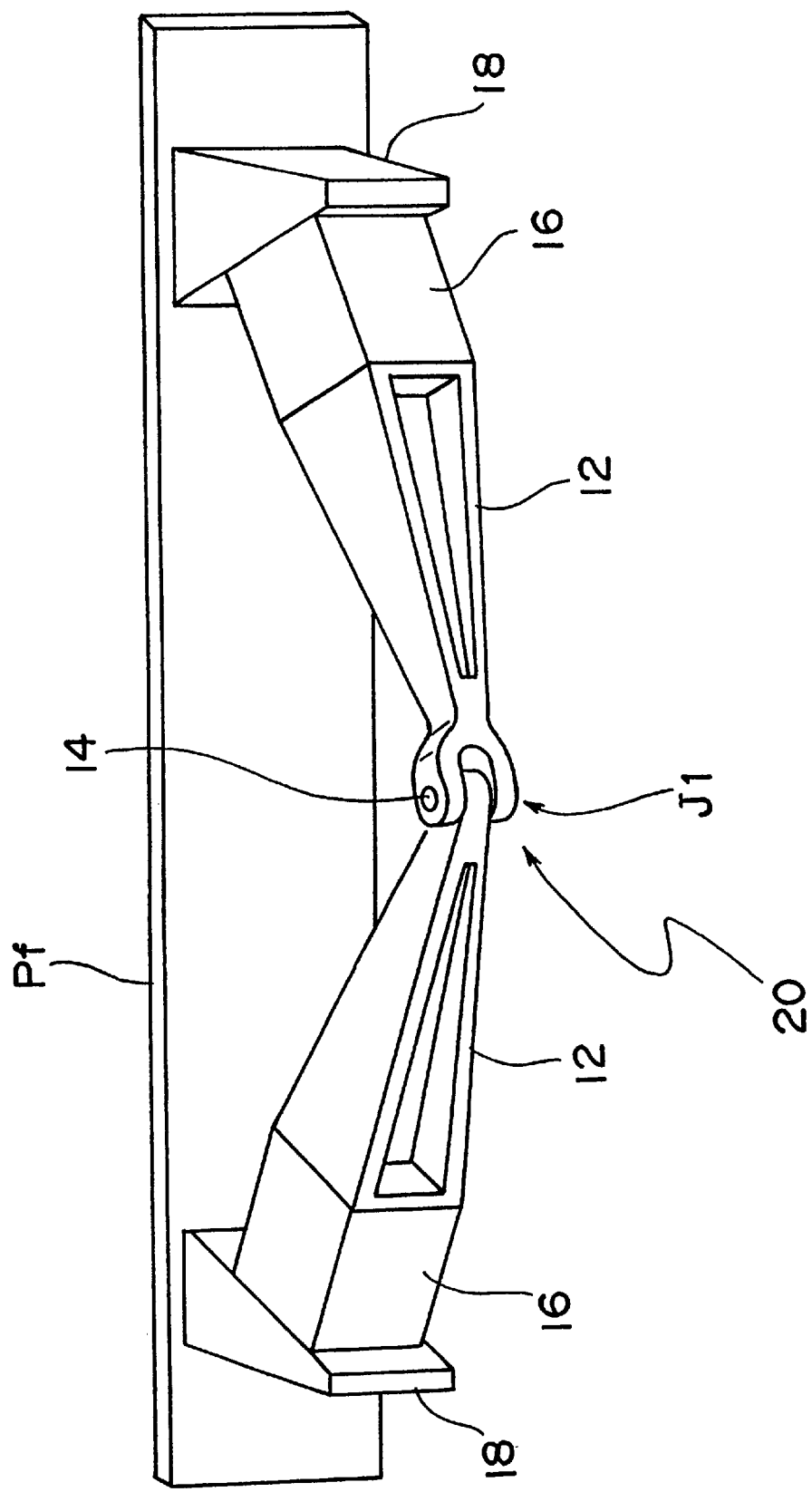
FIG. 12 is a perspective view of an impact absorbing mechanism according to a second embodiment of the invention.

FIG. 12 shows an impact absorbing mechanism 20 according to a second embodiment of the invention. In the following description, parts similar to those in the first embodiment shown in FIGS. 1 to 11 are provided with similar reference numerals to omit further description of them.

In this second embodiment, left and right receiving stopping portions 18 for supporting first impact absorbing members 16 provided on the other end sides of two load dispersing transferring members 12 are integrally connected to each other through a connecting plate Pf. The connecting plate Pf and the two load transferring members 12 are respectively positioned on respective sides of a substantially triangular shape.

Figure 13A:
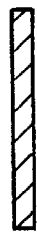
FIGS. 13A, 13B and 13C are vertical sectional views illustrating sectional shapes of a connecting plate for connecting receiving stopping portions of the impact absorbing mechanism according to the second embodiment.
Figure 13B:
Figure 13C:
Figure 14A:
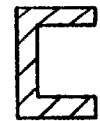
FIGS. 14A, 14B and 14C are vertical sectional views illustrating sectional shapes of the receiving stopping portion connecting plate.
Figure 14B:
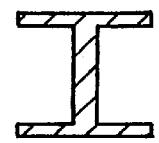
Figure 14C:
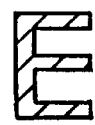

As to the sectional shape of connecting plate Pf, it is possible to employ various shapes as shown in FIGS. 13A to 13C and 14A to 14C, for example. In the present embodiment, the sectional shape as shown in FIG. 13A is employed, for example. Regarding the material of the connecting plate Pf, metal such as steel, magnesium, aluminum, alloys of them, and the like or synthetic resin such as polyethylene resin, polypropylene resin, nylon resin, and the like may be used. The connecting plate Pf and the receiving stopping portions 18 are connected by bonding, welding, seizing, or by a mechanical method such as fitting or screwing, for example. Otherwise, it is also possible to integrally mold both the connecting plate Pf and the portions 18 depending on producing methods thereof.

Figure 15:
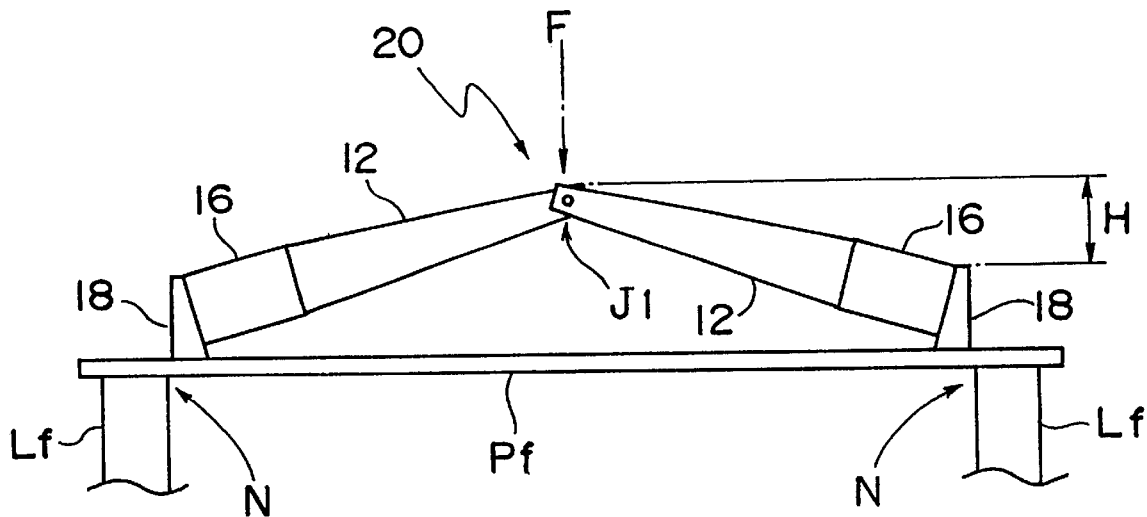
FIG. 15 is a plan view showing a state of the impact absorbing mechanism according to the second embodiment before impact load input.
Figure 16:
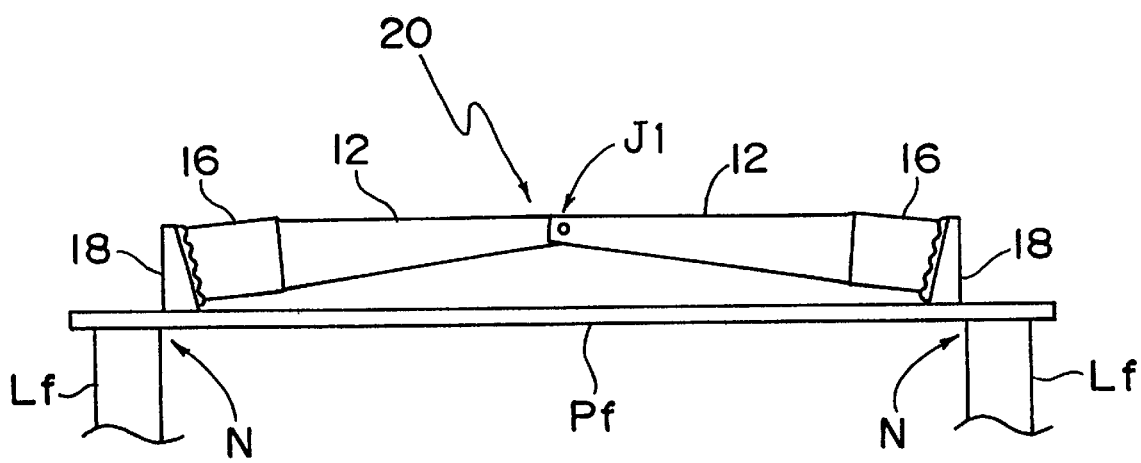
FIG. 16 is a plan view showing a state of the impact absorbing mechanism according to the second embodiment after impact load input.

FIGS. 15 and 16 show a state of impact absorption in an input initial stage by the impact absorbing mechanism 20 according to the second embodiment.

As described above, in the second embodiment, the left and right receiving stopping portions 18 are integrally connected to each other through the connecting plate Pf. The connecting plate Pf and the two load transferring members 12 are respectively positioned on the respective sides of the substantially triangular shape (i.e., these three members form a substantially triangular structure). Thereby, when the impact load F is applied between the receiving stopping portions 18 (especially to a vertex of the triangle), it is possible to suppress outward movement of receiving stopping portions 18 that causes bending loads to act on support portions (receiving portions N) of the receiving stopping portions 18. Therefore, it is unnecessary to make the receiving portions N (i.e., front side frames Lf) excessively strong.

Figure 17:
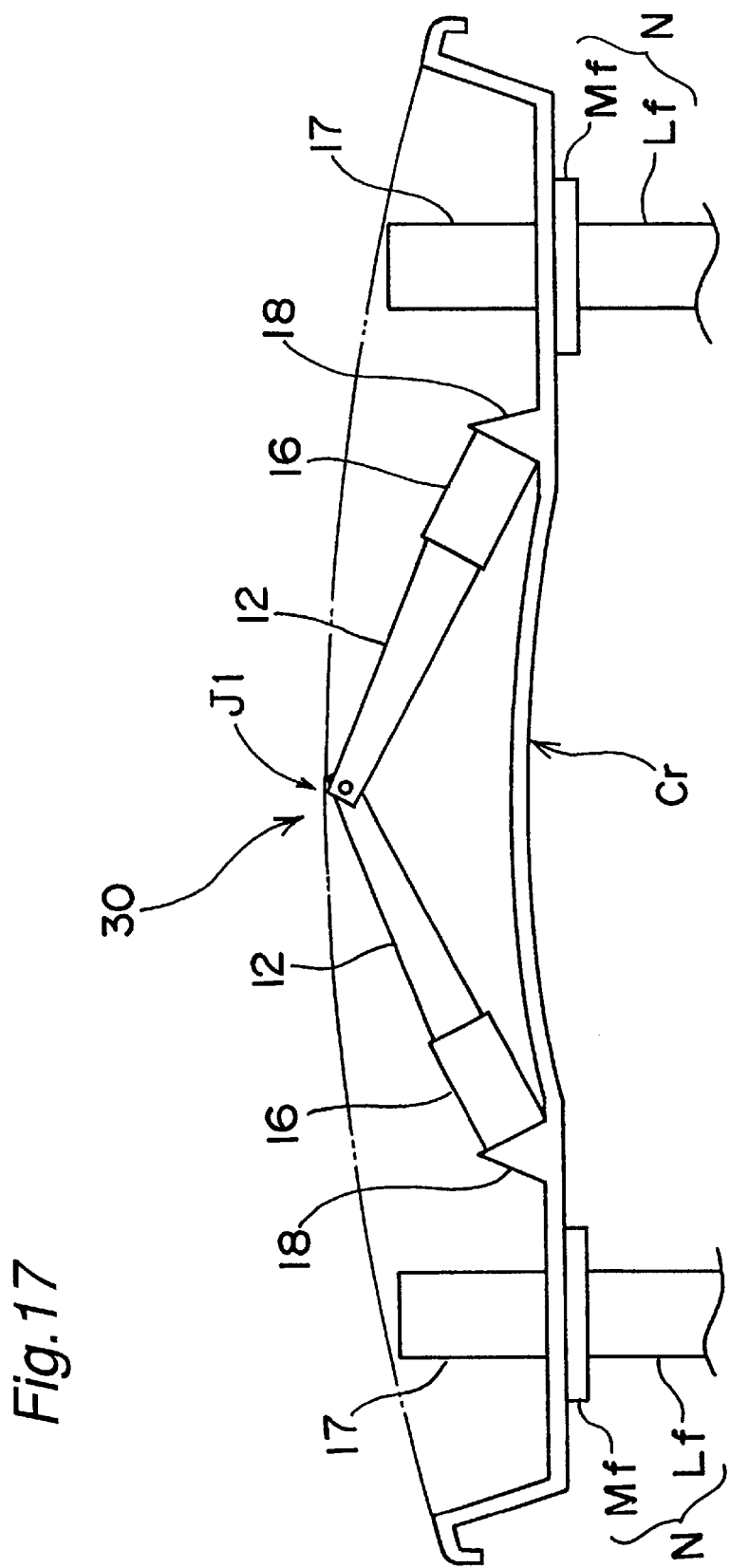
FIG. 17 is a plan view of an impact absorbing mechanism according to a third embodiment of the invention.

FIG. 17 shows an impact absorbing mechanism 30 according to a third embodiment of the invention. In the third embodiment, for the purpose of increasing impact absorption by the second impact absorbing members 17 by as large an amount as possible, the first impact absorbing members 16 for carrying out impact absorption in the initial stage and the receiving stopping portions 18 for receiving the members 16 are completely separated from the second impact absorbing members 17. Furthermore, the first impact absorbing members 16 and the receiving stopping portions 18 are positioned on inner sides of the receiving portions N (specifically, on inner sides of the mounting brackets Mf).

By such disposition and structure, structural members 12 and 16 and portions J1 and 18 for absorbing the initial impact load are pushed into the engine room corresponding to a space between the receiving portions N without directly interfering with the receiving portions N when further impact load is being applied after the initial impact load is absorbed by the first impact absorbing members 16. In other words, the second impact absorbing members 17 on both the sides can satisfactorily absorb impact energy in the middle stage without receiving direct interference from the structure members 12 and 16 and portions J1 and 18 for absorbing the initial impact load.

Although it is not specifically illustrated in the drawings, the receiving stopping portions 18 may be formed integrally with side faces of the second impact absorbing members 17, which is the inverse of the third embodiment. In this case, by integrally forming the members 18 and 17, it is possible to simplify the structure of the impact absorbing mechanism.

Figure 18:
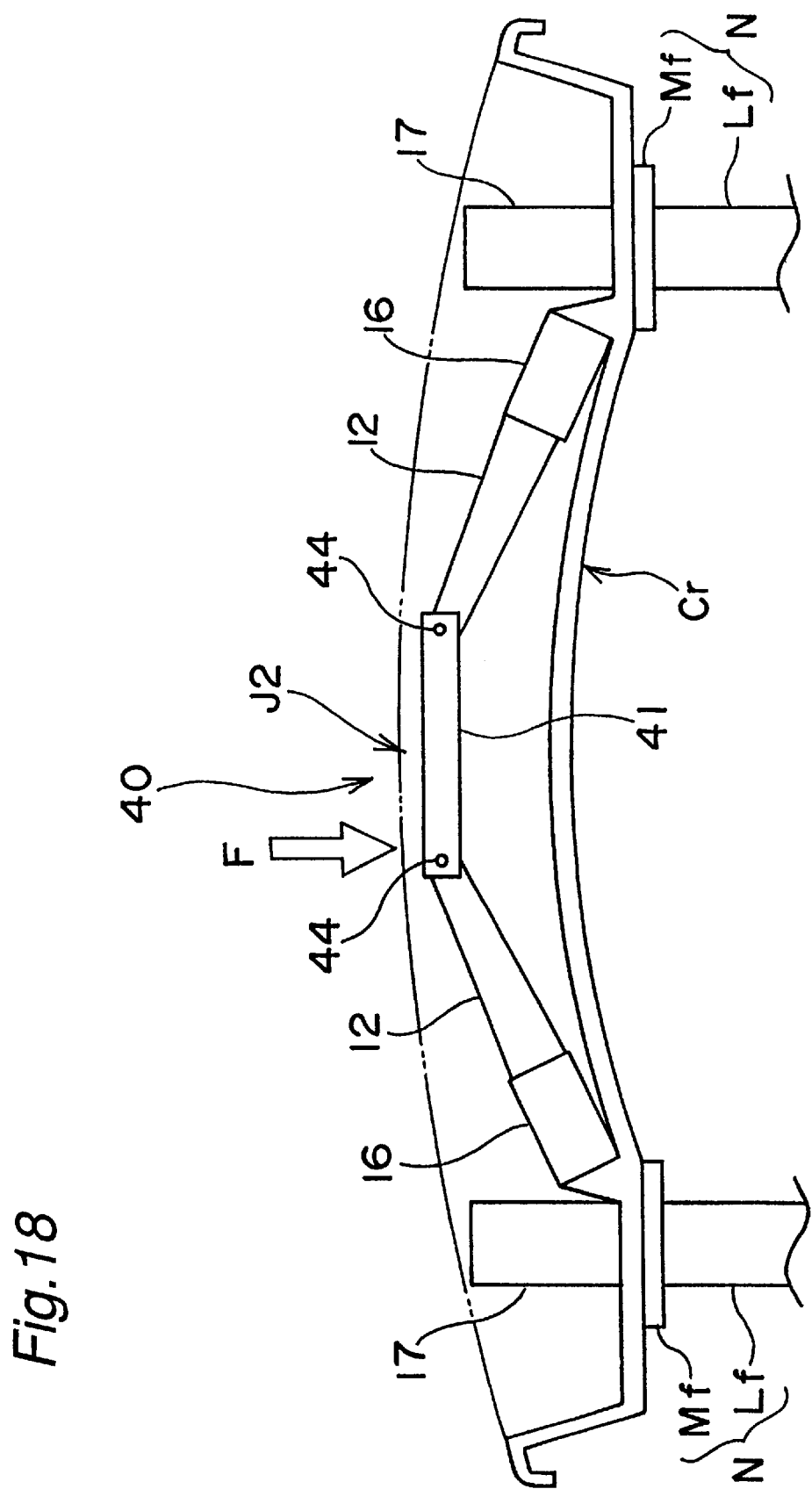
FIG. 18 is a plan view of an impact absorbing mechanism according to a fourth embodiment of the invention.

FIG. 18 shows an impact absorbing mechanism 40 according to the fourth embodiment of the invention. In the fourth embodiment, a joint member 41 is disposed at a connecting portion J2 for connecting respective ends of the two load transferring members 12 such that the member 41 is parallel to a straight line connecting the receiving portions N, for example. Opposite ends of the joint member 41 are rotatably connected to tip end sides of the left and right load transferring members 12 through the pivots 44.

As described above, by disposing the joint member 41 in the connecting portion J2 connecting the respective ends of the load transferring members 12, the impact load F can be transferred along the respective load transferring members 12 through the joint member 41 and impact absorption can be carried out efficiently, even if the impact load F is input to a portion that deviates from the center between the receiving portions N as shown in FIG. 18.

Next, a test conducted for confirming improvement in the impact absorbing property of the impact absorbing mechanism of the vehicle bumper according to the embodiment of the invention will be described.

In this test, bumper reinforcements of the front bumpers to be mounted to automobiles of the same type were produced as a prior-art product (comparative example) made of resin and an example of the invention according to the above first embodiment was produced. Then, static compressive loads were applied to both the examples, and properties of the examples were tested.

The example of the invention included a box-shaped structure (box-shaped structure including two squares) in a shape shown in FIGS. 8A and 9A and a plate thickness of 3 mm was employed. Regarding material, polyethylene resin was employed.

Figure 19:
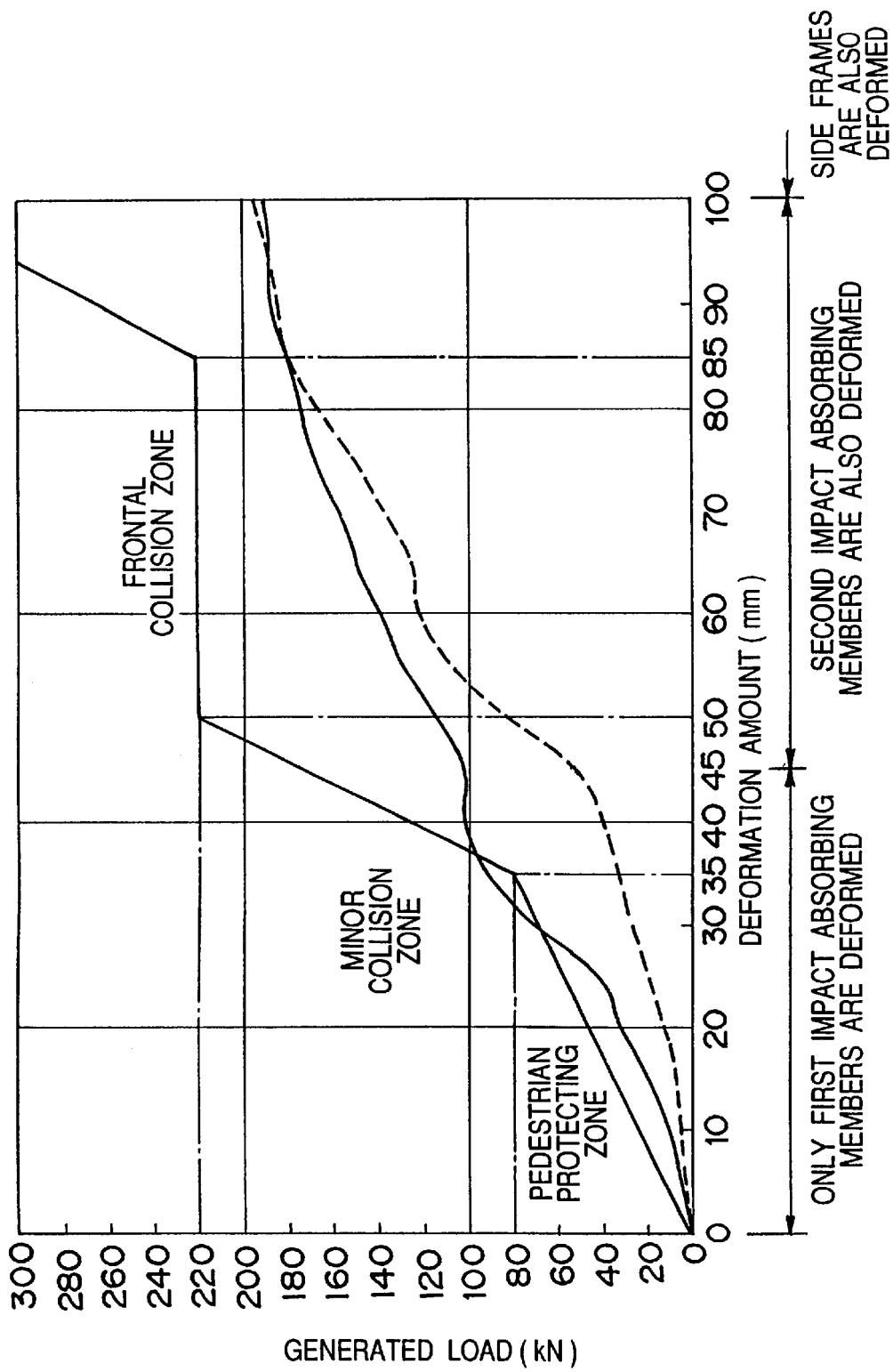
FIG. 19 is a graph showing a test result of the effects of an example embodiment of the invention in comparison with a prior-art product.

Test results are shown in a graph in FIG. 19. In FIG. 19, a solid-line curve shows the example of the invention and a broken-line curve shows the comparative prior-art example. A relationship between a load and a deformation amount (a receding amount of the bumper face due to the load input) as a target of the automobile bumper is shown with a solid line graph in this graph. As shown in the target line graph, a range of a deformation amount up to about 35 mm is referred to as a pedestrian protecting zone, a range of the deformation amount of 35 to 50 mm is referred to as a minor collision zone, and a range of the deformation amount of 50 to 85 mm is referred to as a frontal collision zone, in general. And, these zones are respectively required to have different properties of the relationship between the load and the deformation amount.

As is clear from the graph in FIG. 19, the example of the invention is closer to the target line graph than the comparative prior-art example and especially a load property in the deformation initial stage is enhanced by a large amount and a generated load corresponding to the same deformation amount is increased substantially in the example of the invention.

Needless to say, the invention is not limited to the above embodiments and various modifications and changes in design may be made without departing from the gist of the invention.

What is claimed is:

1. An impact absorbing mechanism provided between receiving portions at a predetermined distance from each other for absorbing an impact load input between said receiving portions, said mechanism comprising:

a dispersing transferring portion for dispersing and transferring said impact load input in a plurality of directions;

impact absorbing portions for respectively absorbing dispersed impact loads from said dispersing transferring portion; and receiving stopping portions for respectively supporting said impact absorbing portions, and said mechanism dispersing and absorbing said impact load in said plurality of directions, wherein said dispersing transferring portion is formed by connecting respective one end sides of a plurality of transferring members, a connecting portion is positioned to be closer to load input sides than to the other end sides of said respective transferring members, and impact absorbing members, for absorbing the impact load in directions along said transferring members, are disposed on said other end sides of said respective transferring members, and wherein each said transferring member is divergent such that a basic sectional area increases toward each said impact absorbing member.

2. A bumper reinforcement provided with a case body having a substantially angular U shape in section and an impact absorbing mechanism provided between receiving portions at a predetermined distance from each other for absorbing an impact load input between said receiving portions, wherein said mechanism comprises: a dispersing transferring portion for dispersing and transferring said impact load in a plurality of directions; impact absorbing portions for respectively absorbing dispersed impact loads from said dispersing transferring portion; and receiving stopping portions for respectively supporting said impact absorbing portions, and said mechanism dispersing and absorbing said impact load in said plurality of directions, at least said dispersing transferring portion and said impact absorbing portions of said impact absorbing mechanism are housed in said case body and an impact load input side of said dispersing transferring portion is supported by upper and lower wall portions of said case body, and wherein the dispersing transferring portion is divergent such that a basic sectional area of the dispersing transferring portion increases as the dispersing transferring portion extends toward each of the impact absorbing portions.

3. A bumper reinforcement provided with a case body having a substantially angular U shape in section and an impact absorbing mechanism provided between receiving portions at a predetermined distance from each other for absorbing an impact load input between said receiving portions, wherein said mechanism comprises: a dispersing transferring portion for dispersing and transferring said impact load in a plurality of directions; impact absorbing portions for respectively absorbing dispersed impact loads from said dispersing transferring portion; and receiving stopping portions for respectively supporting said impact absorbing portions, and said mechanism dispersing and absorbing said impact load in said plurality of directions, at least said dispersing transferring portion and said impact absorbing portions of said impact absorbing mechanism are housed in said case body and an impact load input side of said dispersing transferring portion is supported by upper and lower wall portions of said case body, wherein second impact absorbing portions for carrying out impact absorption after said impact load is input to said dispersing transferring portion are positioned adjacent the receiving portions of said impact absorbing mechanism.

4. The bumper reinforcement according to claim 3, wherein said receiving stopping portions are integrally formed with side faces of said second impact absorbing portions.

5. A bumper reinforcement provided with a case body having a substantially angular U shape in section and an impact absorbing mechanism provided between receiving portions at a predetermined distance from each other for absorbing an impact load input between said receiving portions, wherein said mechanism comprises: a dispersing transferring portion for dispersing and transferring said impact load in a plurality of directions; impact absorbing portions for respectively absorbing dispersed impact loads from said dispersing transferring portion; and receiving stopping portions for respectively supporting said impact absorbing portions, and said mechanism dispersing and absorbing said impact load in said plurality of directions, at least said dispersing transferring portion and said impact absorbing portions of said impact absorbing mechanism are housed in said case body and an impact load input side of said dispersing transferring portion is supported by upper and lower wall portions of said case body, and wherein said dispersing transferring portion is formed by connecting respective load input sides of a plurality of transferring members, a connecting portion is positioned to be closer to the load input sides than to other end sides of said respective transferring members, and impact absorbing members, for absorbing the impact load along said transferring members, are disposed on said other end sides of said respective transferring members.

6. The bumper reinforcement according to claim 5, wherein said dispersing transferring portion includes two transferring members, said receiving stopping portions positioned adjacent said other end sides of said transferring members are integrally connected to each other through a connecting member, and said connecting member and said two transferring members are respectively positioned to form a substantially triangular shape.

7. The bumper reinforcement according to claim 5, wherein a joint member substantially parallel to a straight line connecting said receiving portions is disposed as the connecting portion for connecting said respective load input sides of said transferring members.

8. The bumper reinforcement according to claim 5, wherein each said impact absorbing member is formed into a box shape with ribs formed on an inside of said box shape.

9. The bumper reinforcement according to claim 5, wherein each said transferring member is divergent such that a basic sectional area increases toward each said impact absorbing member.

* * * * *